US009257044B2

(12) United States Patent
Boschker

(10) Patent No.: US 9,257,044 B2
(45) Date of Patent: Feb. 9, 2016

(54) NAVIGATION DEVICE AND METHOD

(75) Inventor: Breght Boschker, Hilversum (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 12/736,726

(22) PCT Filed: Jun. 24, 2009

(86) PCT No.: PCT/EP2009/057877
§ 371 (c)(1),
(2), (4) Date: Nov. 24, 2010

(87) PCT Pub. No.: WO2009/156425
PCT Pub. Date: Dec. 30, 2009

(65) Prior Publication Data
US 2011/0118972 A1 May 19, 2011

Related U.S. Application Data

(60) Provisional application No. 61/129,413, filed on Jun. 25, 2008.

(51) Int. Cl.
G08G 1/123 (2006.01)
G08G 1/09 (2006.01)
G08G 1/14 (2006.01)
G01C 21/34 (2006.01)
G01C 21/36 (2006.01)
G08G 1/0967 (2006.01)
(Continued)

(52) U.S. Cl.
CPC ............ *G08G 1/141* (2013.01); *G01C 21/3476* (2013.01); *G01C 21/3614* (2013.01); *G01C 21/3685* (2013.01); *G08G 1/091* (2013.01); *G08G 1/0969* (2013.01); *G08G 1/09675* (2013.01); *G08G 1/096716* (2013.01); *G08G 1/096775* (2013.01); *G08G 1/096827* (2013.01); *G08G 1/096844* (2013.01); *G08G 1/096861* (2013.01); *G08G 1/096883* (2013.01); *G08G 1/096888* (2013.01)

(58) Field of Classification Search
USPC ......... 701/400, 408, 409, 410, 411, 412, 416, 701/422, 428, 439; 340/905
See application file for complete search history.

(56) References Cited

U.S. PATENT DOCUMENTS

| 5,928,307 | A | | 7/1999 | Oshizawa et al. | |
|---|---|---|---|---|---|
| 5,933,100 | A | * | 8/1999 | Golding | 340/995.13 |
| 6,236,933 | B1 | * | 5/2001 | Lang | 701/117 |

(Continued)

FOREIGN PATENT DOCUMENTS

| EP | 1 387 145 | 2/2004 |
|---|---|---|
| EP | 1 512 943 | 3/2005 |

(Continued)

OTHER PUBLICATIONS

International Preliminary Report on Patentability dated Jan. 5, 2011.

*Primary Examiner* — Thomas G Black
*Assistant Examiner* — Tyler Paige

(57) ABSTRACT

A navigation device is disclosed including a processor; and a store containing map data. In at least one embodiment, the map data includes a temporally-variable feature and the processor is arranged, in a route planning process, to determine a status of the temporally-variable feature according to temporal information.

18 Claims, 10 Drawing Sheets

(51) Int. Cl.
*G08G 1/0968* (2006.01)
*G08G 1/0969* (2006.01)

(56) References Cited

U.S. PATENT DOCUMENTS

| | | | |
|---|---|---|---|
| 6,401,029 B1* | 6/2002 | Kubota et al. | 701/408 |
| 6,480,783 B1* | 11/2002 | Myr | 701/117 |
| 6,633,812 B1 | 10/2003 | Martin et al. | |
| 6,711,493 B1* | 3/2004 | Andrews et al. | 701/117 |
| 6,810,321 B1* | 10/2004 | Cook | 701/117 |
| 6,950,745 B2* | 9/2005 | Agnew et al. | 701/414 |
| 7,096,115 B1* | 8/2006 | Groth et al. | 701/117 |
| 7,100,825 B2* | 9/2006 | Levine | 235/384 |
| 7,221,287 B2* | 5/2007 | Gueziec et al. | 340/905 |
| 7,233,861 B2* | 6/2007 | Van Buer et al. | 701/424 |
| 7,375,649 B2* | 5/2008 | Gueziec | 340/905 |
| 7,433,889 B1* | 10/2008 | Barton | |
| 7,508,321 B2* | 3/2009 | Gueziec et al. | 340/905 |
| 7,693,657 B2 | 4/2010 | Endo et al. | |
| 8,126,641 B2* | 2/2012 | Horvitz | 701/414 |
| 8,332,141 B2* | 12/2012 | Couckuyt | 701/430 |
| 8,385,946 B2* | 2/2013 | Forstall et al. | 455/456.6 |
| 8,909,465 B2 | 12/2014 | Nesbitt | |
| 2005/0027436 A1* | 2/2005 | Yoshikawa et al. | 701/117 |
| 2005/0114020 A1* | 5/2005 | Seto et al. | 701/211 |
| 2006/0089787 A1 | 4/2006 | Burr et al. | |
| 2006/0106530 A1* | 5/2006 | Horvitz et al. | 701/117 |
| 2006/0122771 A1* | 6/2006 | Mikuriya et al. | 701/210 |
| 2006/0122846 A1* | 6/2006 | Burr et al. | 705/1 |
| 2006/0178807 A1* | 8/2006 | Kato et al. | 701/117 |
| 2006/0184322 A1* | 8/2006 | Kim | 701/211 |
| 2006/0287808 A1* | 12/2006 | Breitenberger et al. | 701/117 |
| 2006/0293845 A1* | 12/2006 | Watanabe | 701/208 |
| 2007/0106465 A1 | 5/2007 | Adam et al. | |
| 2007/0156326 A1 | 7/2007 | Nesbitt | |
| 2007/0225894 A1 | 9/2007 | Tsukamoto | |
| 2007/0276596 A1 | 11/2007 | Solomon et al. | |

FOREIGN PATENT DOCUMENTS

| | | |
|---|---|---|
| EP | 1 600 735 | 11/2005 |
| EP | 1 811 269 | 7/2007 |
| FR | 2 852 688 | 9/2004 |
| GB | 2 431 261 | 4/2007 |
| GB | 2 443 472 | 5/2008 |
| JP | H10221100 A | 1/1997 |
| JP | 2002156236 A | 5/2002 |
| JP | 2005274315 A | 10/2005 |
| JP | 2006214853 A | 8/2006 |
| JP | 2008083918 | 4/2008 |
| JP | 2008083918 A | 4/2008 |
| JP | 2009014543 A | 1/2009 |
| WO | WO 2004/021306 | 3/2004 |
| WO | WO 2005/043082 | 5/2005 |

* cited by examiner

FIG. 6(a)
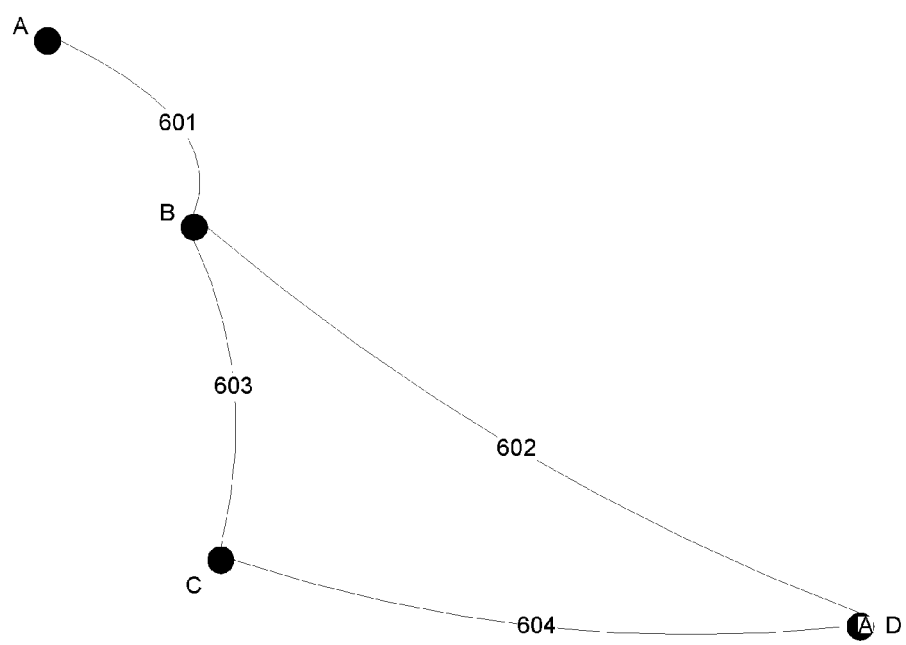
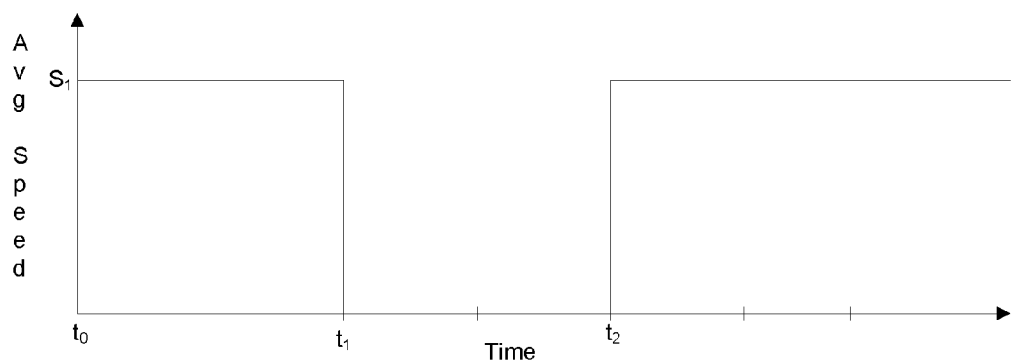
FIG. 6(b)

NAVIGATION DEVICE AND METHOD

This is a National Phase of PCT Patent Application No. PCT/EP2009/057877, filed on Jun. 24, 2009, which claims priority under 35 U.S.C. §365(c) and 119(e) to U.S. Provisional Application No. 61/129,413, filed on Jun. 25, 2008, the contents of each of which are hereby incorporated herein by reference in their entirety.

FIELD OF THE INVENTION

This invention relates to navigation devices, systems and to methods for providing navigation information. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

A problem arises with respect to changes to road networks which occur temporarily. For example, as a result of an event, such as a sporting or cultural event, or as a result of work being undertaken either to a road or proximal to it, changes to a road network occur, such as the closure of roads. However, such changes are not reflected in the map data upon which route planning, navigation and guidance is provided. This may result in a user of a navigation device being directed along closed or busy roads.

It is an aim of the present invention to address this problem, in particular to attempt to allow temporary changes to road networks to be accounted for in route determination, navigation and guidance.

SUMMARY OF THE INVENTION

In pursuit of this aim, a presently preferred embodiment of the present invention provides a navigation device comprising a processor, and a store containing map data, wherein the map data comprises a temporally-variable feature, and the processor is arranged to determine, in a route planning process, a status of the temporally-variable feature according to temporal information.

The temporally-variable feature of the map data may be a map feature having a temporally-variable attribute or a map feature having temporally-variable validity. Preferably, the temporally-variable attribute has a value which is different for at least two times or time periods defined in the map data, or the temporally-variable validity indicates that the map feature forms can be considered in the route planning process for one or more periods of time defined in the map data.

The temporally-variable attribute may be speed or weighting information, used to determine a cost of a road segment in the route planning process, associated with the road segment. The temporally-variable validity may indicate one or more periods of time for which a map feature is available for consideration in the route planning process.

Information associated with the temporally-variable feature may indicate a period of time for which the feature is temporally-variable. The period of time may be indicated by a start time, a duration and/or an end time, or as a function of time.

The map data may comprise first map data including map feature information and second map data comprising the temporally variable feature. The first map data may not be temporally-variable. The second map data may have been received from an external source and stored in the store subsequent to the first map data.

The navigation device may comprise a temporal mapping module arranged to determine a status of the temporally-variable feature according to the temporal information. The map data may comprise a plurality of temporally-variable features, each feature having associated temporal information indicating a period of time for which the respective feature is temporally-variable.

Another embodiment of the present invention relates to a method of determining a route from a start location to a destination location by a processor, comprising steps of: determining a status of one or more temporally-variable map features according to temporal information, and determining the route from the start location to the destination location with respect to the status of the one or more temporally-variable map features. The processor may be a processor of a navigation device.

Yet another embodiment of the present invention relates to computer software comprising one or more software modules operable, when executed in an execution environment, to cause a processor to determining a status of one or more temporally-variable map features according to temporal information, and determining the route from the start location to the destination location with respect to the status of the one or more temporally-variable map features. The processor may be a processor of a navigation device.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 6 is an illustration of an exemplary portion of map data and an attribute of the map data which has a temporally-variable value;

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
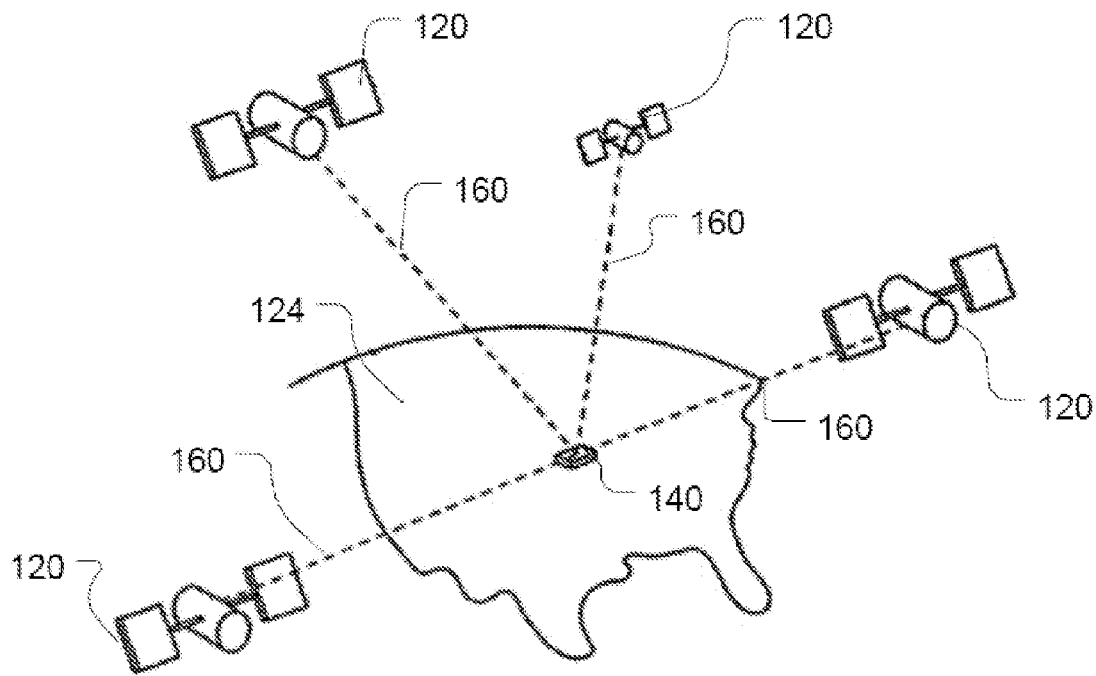
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
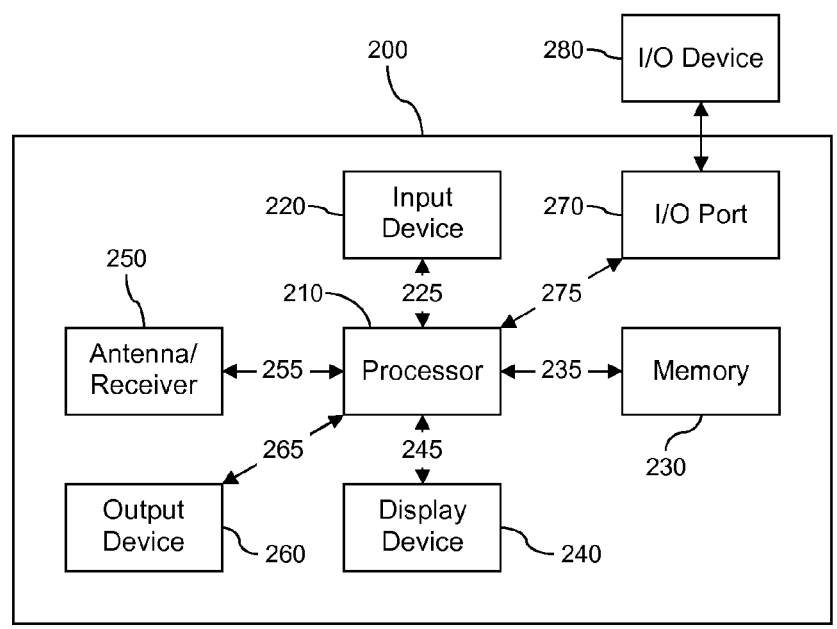
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
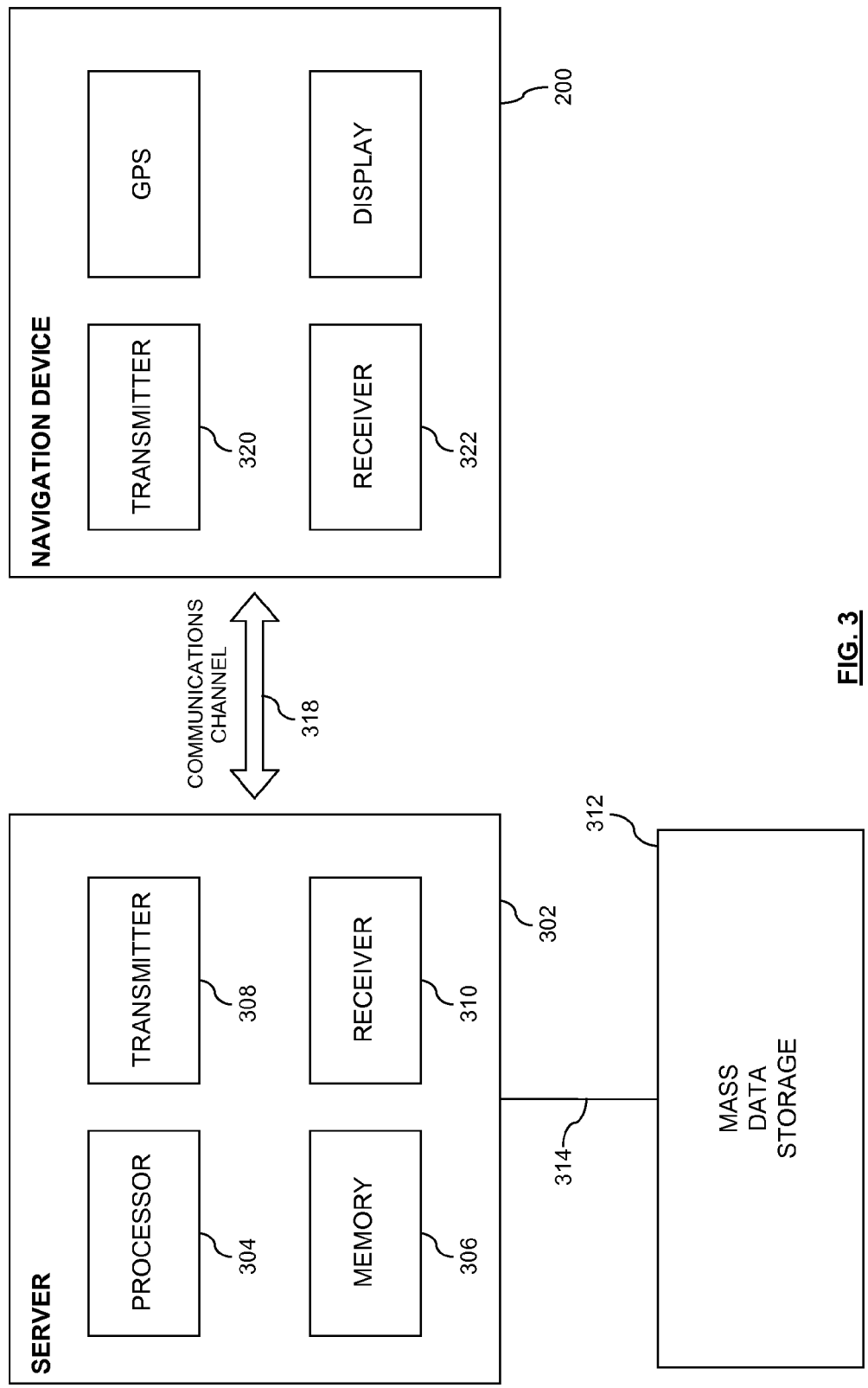
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the Internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
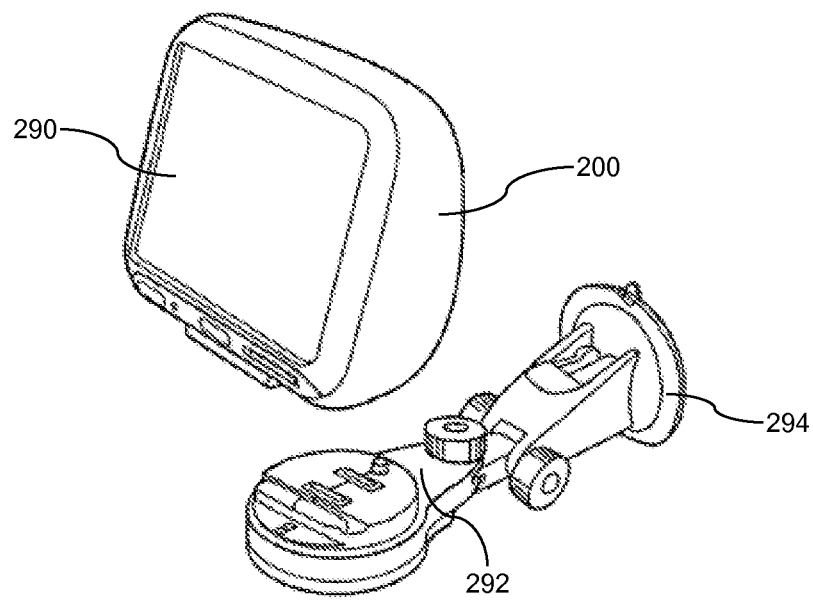
FIGS. 4A and 4B are illustrative perspective views of a navigation device.
Figure 4B:
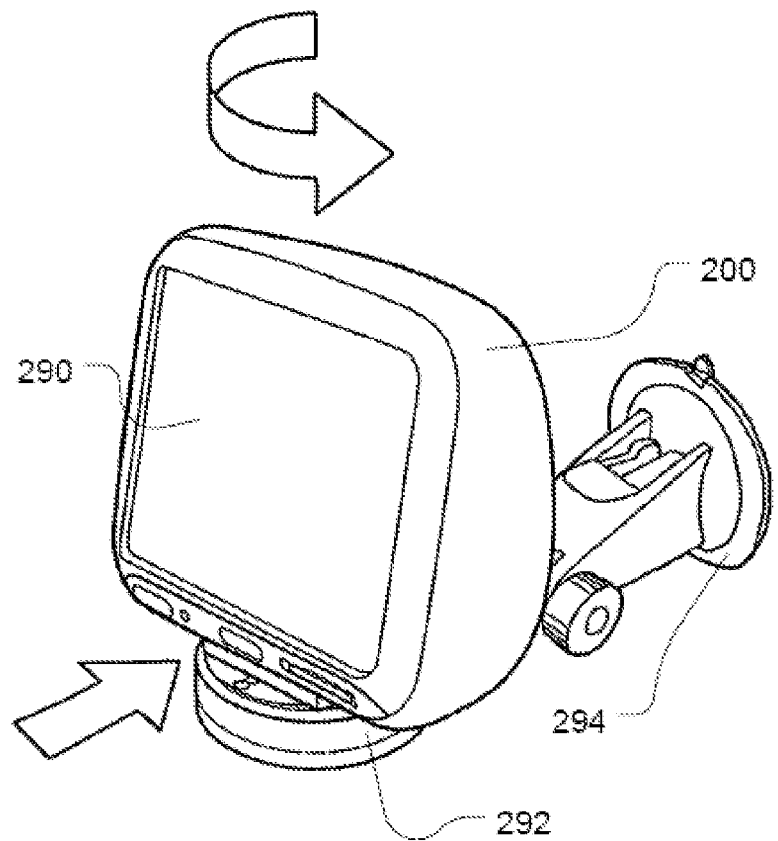

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
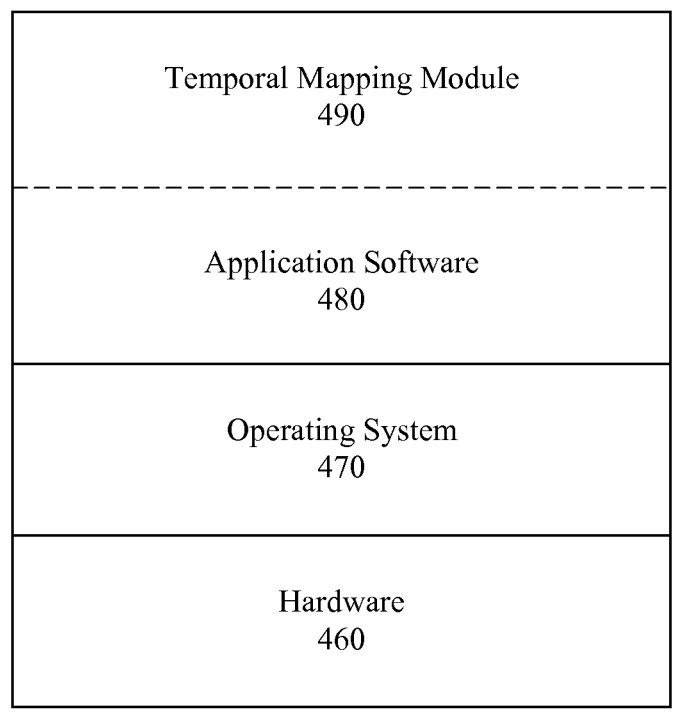
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a temporal mapping module 490, the function of which will now be described in detail in connection with the following figures.

Embodiments of the present invention concern temporally-variable map data. Temporally-variable map data is data which includes information about map features, such as about locations and/or roads. At least one aspect of the temporally-variable map data is time-dependant. That is, at least one part of the map data changes with time i.e. changes during one or more periods of time defined in the temporally-variable map data. Changes may be an addition or deletion of a feature in the map data, or a change in an attribute of the map data. For example, the temporally-variable map data may include feature information identifying a map feature, such as a road, which is only valid, i.e. forms part of the map data, for a specified period of time. Examples of features having temporally-variable validity are temporary roads or car parks which are established or opened for an event. In these cases, an access road or car park may be opened for a period of time specified in advance e.g. between two particular dates/times. In this way, temporally-variable map data differs from traffic information, which may indicate that a road is closed and be taken into account in a route planning process, since the closure due to traffic conditions would not be known in advance. In contrast, temporally-variable map data includes predetermined temporal information i.e. is known in advance, for example at a time of storing the map data.

Examples of temporally-variable map data are: the addition of a map feature, such as one or more of a road, point of interest (POI), car park, etc; the closure or restriction of a map feature, such as one or more of a road, POI, car park, etc.; or a change of one or more attributes in the map data, such as an speed or weight information associated with one or more road segments. Furthermore, temporary diversions may be included in the temporally-variant map data which redirect destination locations to other locations such that then the destination location is selected in a route planning process another substitute destination is used for the destination.

Temporally-variable map data may include temporal information in a number of ways. In one embodiment, the temporally-variable map data includes a start time indicating a time at which a change in the map data begins and a duration for which the change is operative. In another embodiment, the temporally-variable map data includes a start time indicating a time at which a change in the map data begins and an end time indicating a time at which the change to the map data ends i.e. the change is reversed. In another embodiment, the temporally-variable map data includes the start time, the end time and a plurality of intermediate time periods at which an attribute assumes different i.e. intermediate values.

The temporally-variable map data may be stored within and utilised by the navigation device 200 during a route planning process. During the route planning process the map data is considered in relation to a time for which a journey is being planned in order to determine a route. That is, if the route is being planned for a time at which a temporal change has been made to the map data, the change is considered during the route planning process. In some embodiments, as will be explained, the temporally-variable map data is used to modify existing map data. That is, the temporally-variable map data acts as a "patch" to modify existing map data such that temporally-variable map data changes the existing map data for one or more periods of time indicated in the temporally-variable map data. The temporally variable map data may be communicated to navigation devices 200 via the communications channel 318.

Temporally-variable map data will now be explained in more detail with reference to FIGS. 6 to 10.

Referring to FIG. 6, of a portion of map data is illustrated in FIG. 6(a) which contains four locations A-D, shown as nodes, and four roads 601-604 linking those locations, shown as edges. FIG. 6(b) illustrates a temporally-variable expected average speed for road 602 which links locations B and D. The expected average speed is an attribute of road 602 which is considered in a route planning process involving the road 602. However, other speeds, such as maximum speed, may be considered. The expected average speed for road 602 is a predetermined value $s_1$ until a first predetermined time $t_1$. The expected average speed drops to 0 between times $t_1$ and a second predetermined time $t_2$, whereupon it returns to the previous expected average speed $s_1$. The reduction in the average speed for road 602 to 0 between times $t_1$ and $t_2$ effectively causes road 602 to be discarded from consideration during the route planning process between times $t_1$ and $t_2$. In other words, road 602 is considered to be closed between times $t_1$ and $t_2$. For example, this may be due to expected maintenance work taking place on the road 602 or an event, such as a carnival, taking place proximal to the road 602 between times $t_1$ and $t_2$. Whilst in the temporally-variable map data shown in FIG. 6, the expected average speed of road 602 is reduced to 0 to indicate closure of the road between times $t_1$ and $t_2$, the same effect may be achieved in different ways, for example by changing value of a maximum speed attribute of road 602 between times $t_1$ and $t_2$ considered in the route planning process. Furthermore, whilst the expected average speed for road 602 is reduced to 0, one or more other predetermined expected average speeds may be considered. For example, the expected average speed may be reduced to a non-zero value $s_2$ between $t_1$ and a predetermined time $t_3$ intermediate to times $t_1$ and $t_2$, and 0 between $t_3$ and $t_2$. It will be noted that these are merely illustrative values and times.

Temporally-variable map data may also include an attribute the value of which varies as a function of time or algorithmically. For example, the average speed for a road in the map data is defined to change as a function of time. Similarly, a weight of a road in the map data may change as a function of time.

Continuing to refer to the example temporally-variable map data shown in FIG. 6, at a time between $t_0$ and $t_1$, a user utilising a navigation device 200 having stored therein the map data illustrated in FIG. 6 operates the navigation device 200 to determine a route from a start location A to a destination location D. According to user preference information stored in the navigation device 200, the determined route is to be the fastest route from A to D, although it may be realised that the user preferences may indicate that other routes are desired e.g. the shortest route, route excluding certain types of road etc. The route determined by the navigation device comprises roads 601 and 602. Road 602 is included in the determined route in preference to roads 603 and 604, which could also be used to reach location D from intermediate location B, via location C, due to it being faster (according to the user's preference) to reach location D from location B than using roads 603 and 604. In other words, the road 602 has a combination or greater expected average speed and/or shorter distance than roads 602 and 604 which is set as the user's preference for route determination. However, between times $t_1$ and $t_2$ when the same route between locations A and D is determined by the navigation device 200 according to the same user preferences, the determined route includes roads 601, 603 and 604 due to the road 602 having an expected average speed of 0. In this way, the temporally-variable map data implements a temporary closure or restriction of a feature in the map data, which is known in advance in contrast to utilisation of dynamically received traffic information.

In another example of temporally-variable map data, a weight or cost attribute associated with one or more vertices in the map data is temporally variable. For example, the weight or cost attribute of road 602 shown in FIG. 6 may be changed between times $t_1$ and $t_2$ to a value different to that prior to time $t_1$ and subsequent to time $t_2$. Weights or cost attributes may be considered in a route planning process which aims to find a minimised weight or cost for a determined route by considering a sum of weights or costs of possible routes between a start location and a destination location. For example, the route planning process may be based upon Dijkstra's algorithm or a variation thereof. The weight or cost attribute of each road segment may correspond to a length of the road segment, wherein a shortest route may be found by determining the route between the start and destination locations having the lowest weight or cost. Alternatively, the weight or cost may be based upon a combination of the length of road segment and an expected average or maximum speed of that road segment. In this case, determining the route between the start and destination locations having the lowest weight or cost finds the fastest route between the start and destination locations. In one embodiment of the temporally variable map data, a weight or cost attribute of a road segment is increased in order to reduce a likelihood of that road segment being included in a determined route. For example, between times $t_1$ and $t_2$ the weight or cost attribute of road 602 may be increased to a predetermined value greater than the weight or cost value of road 602 outside those times. The predetermined weight may be infinite, which would effectively render the road segment closed, although a predetermined value may be chosen which is much higher than would be expected of realistic road segments.

Figure 7A:
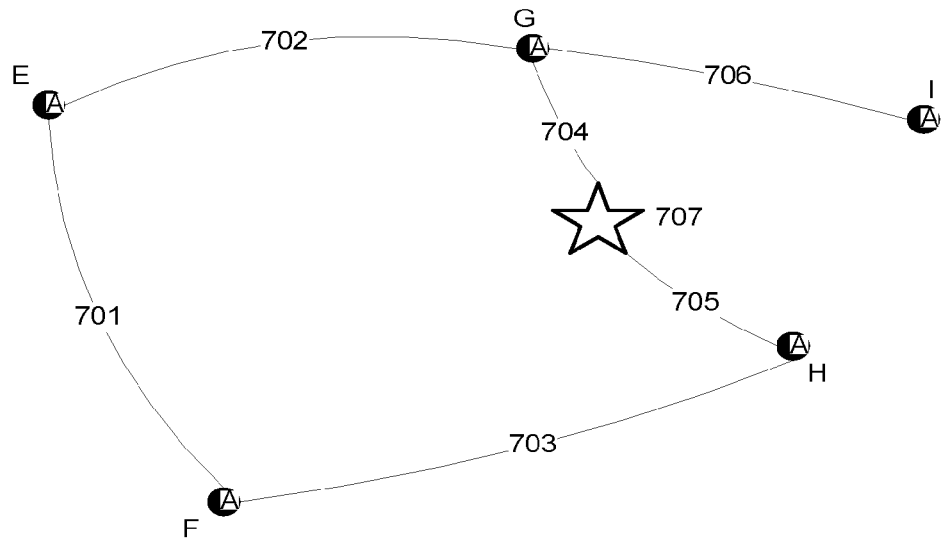
FIG. 7 is an illustration of map data including a feature having temporally-variable validity.
Figure 7B:
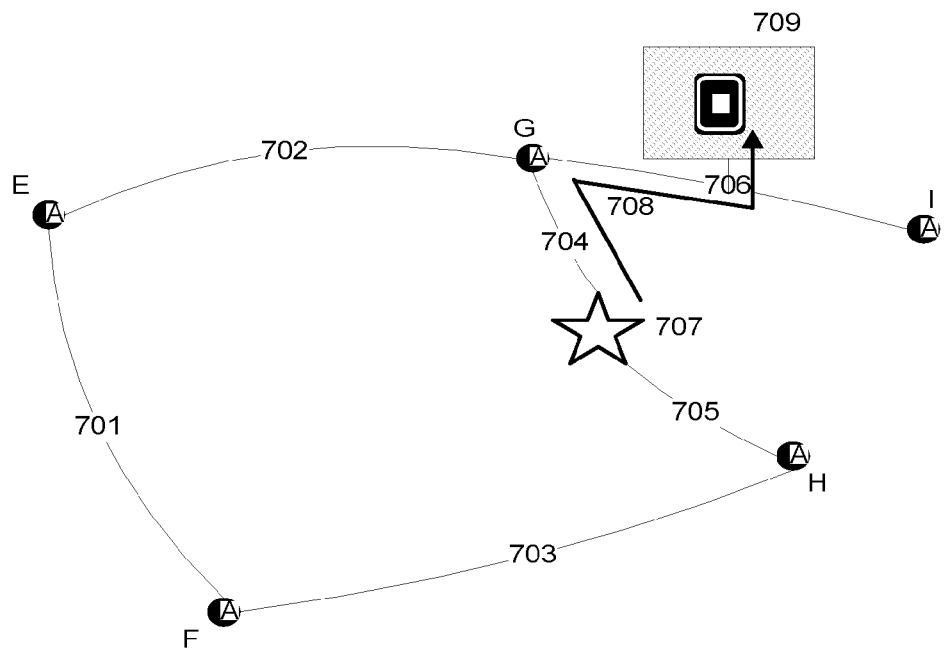

FIG. 7 illustrates a further example of temporally-variable map data. In the example described with reference to FIG. 7, a feature is temporarily introduced into the map data. In the illustrated example, a temporary diversion is included in the map data for a period of time. The diversion is established between a POI, for example an event location, and a car parking area. However, it will be realised that other temporally variable features may be included in the map data. The illustrated portion of map data shown in FIG. 7(a) includes five locations A-E, shown as nodes, and six roads 701-706, which are represented as edges, linking those locations. A POI 707 is included in the illustrated portion of map data. The POI may be one of an event location e.g. showground, sports stadium or the like where it is expected that a large number of visitors will attend during a predetermined time period of an event. In order to cope with the expected number of visitors, the authorities have provided a car park 709. The car park may or may be permanent or temporary i.e. provided solely for the duration of the event. However, as indicated by FIG. 7(b) during the event visitors are to be directed to the car park 709, rather than to the POI 707 itself by inclusion of a temporary diversion 708 in the map data between the POI 707 and the car park 709. A User of a navigation device selecting the POI 707 as a destination location during the duration of the event is automatically directed to the car park 709 i.e. the car park 709 is set as the destination in place of the POI 707. This may be achieved by storing as an attribute of the POI, redirection information which automatically sets the destination location to that of the car park 709 by following diversion 708. Furthermore, in order to deter visitors from utilising roads 704, 709, an attribute of these roads, such as their respective expected average or maximum speed attributes, or their weights may be altered during the duration of the event. For example, a user setting location F as a start location and POI as the destination outside of the event duration would be directed via a route including roads 703 and 705. However, during the duration of the event, the destination location would automatically be changed to the car park 709 and the determined route include roads 701, 702 and a part of road 706 to the car park 709 due to the reduction in expected average speeds of roads 704 and 705 causing the determined route to go via roads 701 and 702 in preference.

Figure 8:
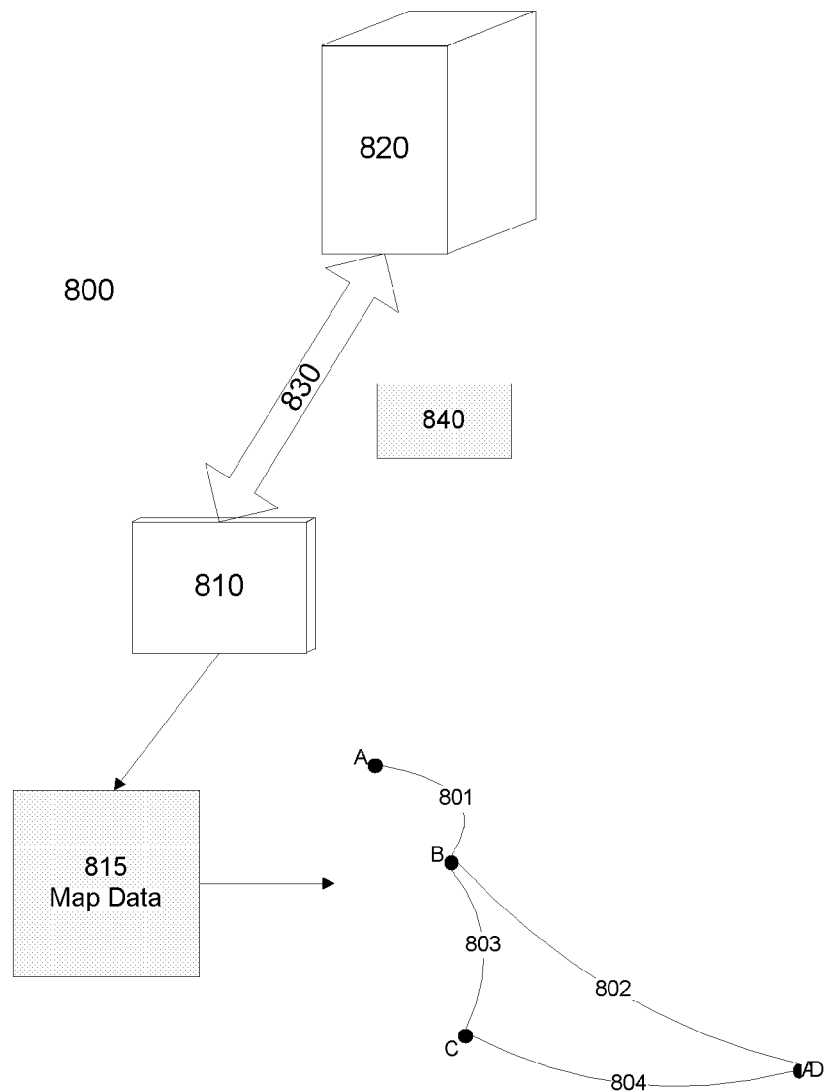
FIG. 8 illustrates a system for communicating temporally-variable map data.

FIG. 8 illustrates a system in which temporally-variant map data is communicated to a navigation device. The system 800 comprises a navigation device 810 which has map data 815 stored therein, for example in memory 230. FIG. 8 provides an illustration of the map data 815 comprising locations A-D and roads 801-804 connecting those locations. The map data 815 further comprises expected average speed information for each road in the map data 815, which is used in a route planning process. It will be realised that the map data 815 may comprise other information, such as weight information for each road, which enables a cost of a route to be determined according to one or more criteria. The navigation device 810 is communicatively coupled to a server 820 via a data communications channel 830 which may be direct or indirect i.e. via another device such as a mobile telephone, or include data stored on a removable storage medium, such as a memory card. The server 820 is arranged to transmit temporally-variant map data 840 to the navigation device 840 via the communications channel 830. In order to avoid a need to communicate the entire map data 815 containing temporally-variant information to the navigation device 810, the temporally-variant map data 840 is to be used in conjunction with the map data 815 stored in the navigation device 810 by the temporal mapping module 490. As shown in FIG. 8, the temporally-variant map data 840 contains start time information 841 identifying a start time of each change to the map data 815, end time information 842 identifying an end time of each change to the map data 815, feature information 843 identifying which feature of the map data 815 is to be changed, attribute information 844 identifying an attribute of the feature to be changed e.g. expected average speed, maximum speed, weight, etc, and a changed value 845 for the attribute.

Once the temporally variant map data 840 is received by the navigation device 810 and stored in the memory 230, the temporal mapping module utilises the temporally-variant map data 840 in conjunction with the existing map data 815 such that attributes of the map data, i.e. average speed information of road 802, have the changed value 844 for a duration of time specified by the start and end information 841, 842 specified in the temporally-variant map data 844 rather than the normal value specified by the map data 815.

Figure 9A:
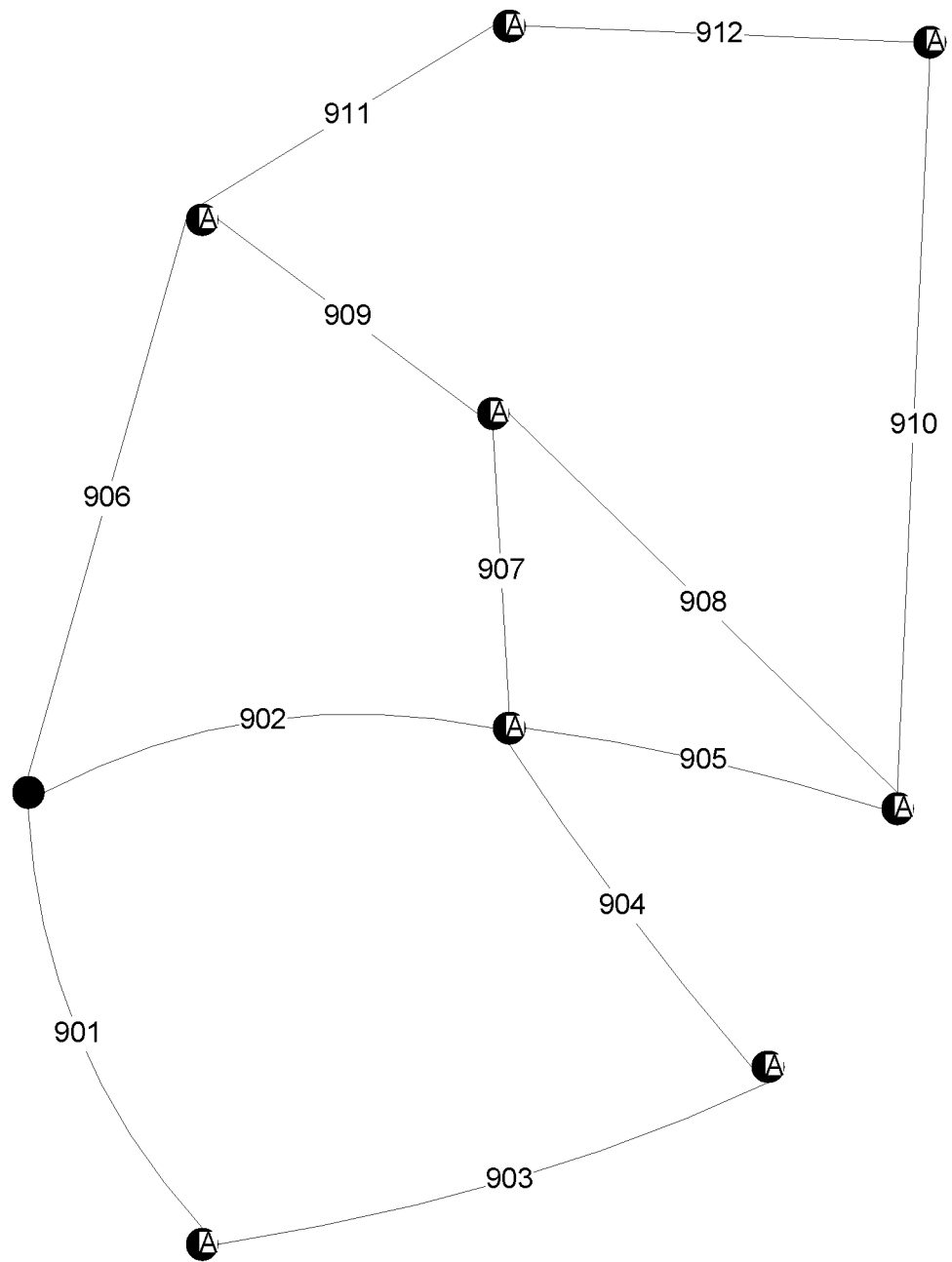
FIG. 9 is map data illustrating a process of determining attribute values.
Figure 9B:
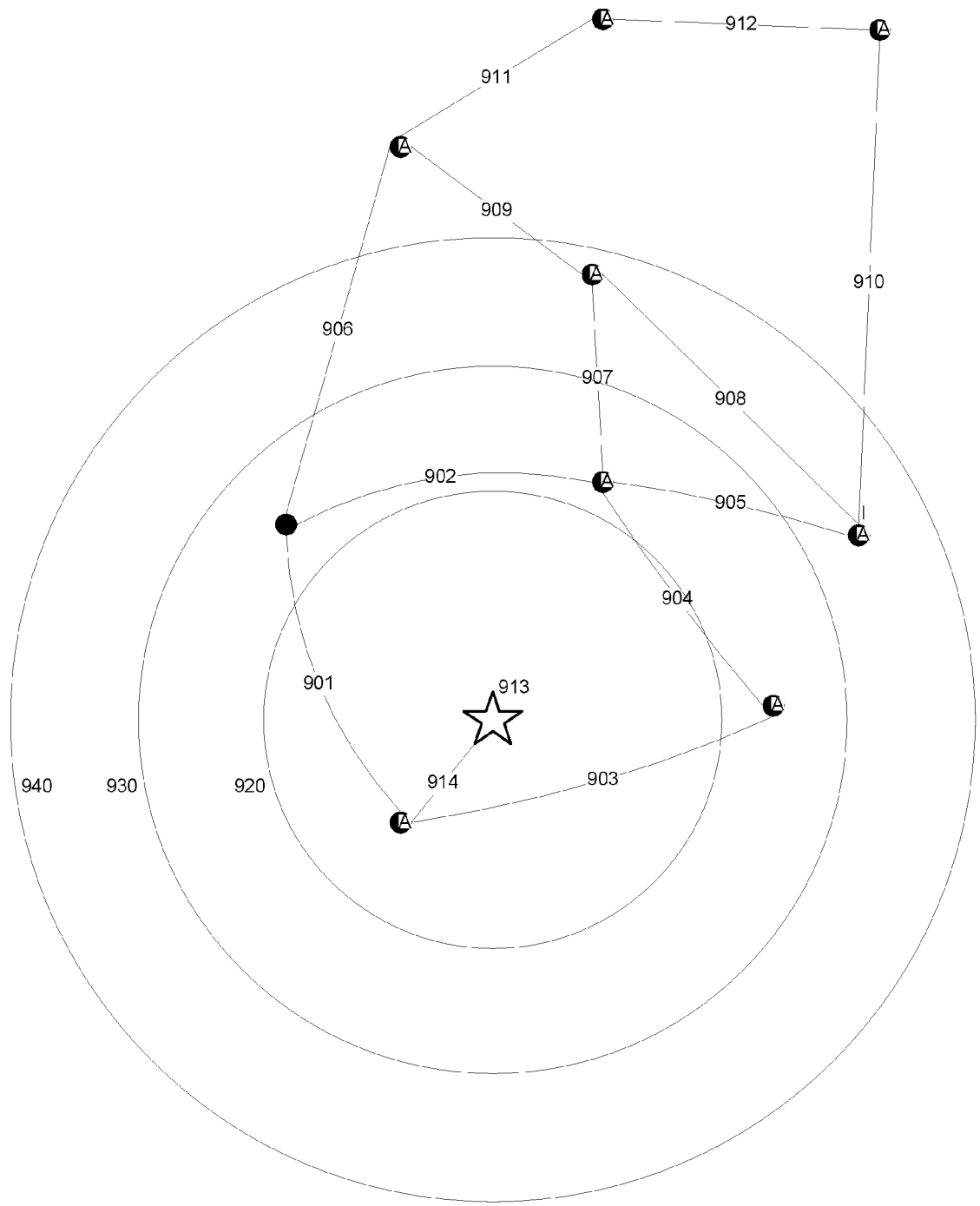

FIG. 9(*a*) illustrates example map data comprising nine locations and twelve roads linking those locations. As noted above, the map data illustrated in FIG. 9(*a*) may be stored in a memory 230 of a navigation device 200. FIG. 9(*b*) illustrates a process of determining temporally-variant weights for roads in map data. The map data shown in FIG. 9(*b*) corresponds to that shown in Figure (a). In addition, the map data shown in FIG. 9(*b*) includes a location of an event 913 and a temporary road 914 providing access to the event 913. In one embodiment of the invention, temporally-variant weightings for roads in a vicinity of the event are determined based upon a distance of each road from the event 913. In the illustrated example, three levels of temporally-variant weighting are applied to roads surround the event 913. FIG. 9(*b*) shows three perimeters 920, 930, 940 plotted around the event 913 at predetermined radii there-from. The three radii may be first, second and third multiples of the same radius, or may be predetermined value. For example, the first, second and third radii may be 5, 10 and 15 km. However, in another embodiment, the first second and third radii may be 5, 7 and 13 km. It will be realised that other distances may be selected as appropriate. Alternatively, weights may be determined as a continuous function based upon a distance from a map feature, such as the event 913. Roads 901, 903, 904, 913 which are at least partly within the first perimeter 920 are assigned a first weight value; roads 902, 905, 906 at least partly within the second perimeter 930 are assigned a second weight value; and roads 908, 909, 910 at least partly within the third perimeter 940 are assigned a third weight value. The assigned weight values may be determined based upon an initial weight value of each road, for example, by having a weight penalty added to the initial weight of the road. Alternatively, the assigned weight values may be determined according to the perimeter in which each road is partly located without reference to the initial weight value of the road. For example, roads 901, 903, 904, 913 are assigned a temporally-variant weight value greater than roads 902, 905, 906 which are assigned a temporally-variant weight value greater than roads 908, 909. The assignment of graduated weights to roads according to their distance from the event 913 gradually discourages the inclusion of those roads into routes, unless it is necessary for those roads to be used to arrive at a destination location, such as event 913. For example, when the navigation device 200 is executing a route determination process to determine a route from a start location to a destination location which would normally partly be proximal to the event 913, such as part of the route running generally past the event on road 903, when considering the temporally-variable map data in which the road 903 has been given a relatively high associated weight due to being within the first perimeter 920, the route planning process may then determine a route avoiding use of the road 903 due to its high cost. The same route during the event may include roads 905, 902 or other roads having an even lower associated cost. In this way, the assignment of weights to roads correspondingly closer to the event 913 has the effect of reducing passing traffic in the locality of the event 913.

Whilst in the description associated with FIG. 9 it has been described that roads at least partly entering a perimeter are assigned a corresponding weight value, in another embodiment, road segments may be subdivided such that a temporally-variant weight is only assigned to a part of a road located within each perimeter 920, 930, 940. For example, a portion of road 906 located internal to second perimeter 930 is assigned the second weight value, whereas the portion of the road 906 outside the second perimeter 930 but inside the third perimeter 940 is assigned the third weight value. The weight value of the portion of road 906 outside the third perimeter 940 is not changed. As described previously with reference to FIG. 8, temporally variant map data 840 is communicated to the navigation device 810 for use in combination with the existing map data 815 stored therein.

Figure 10:
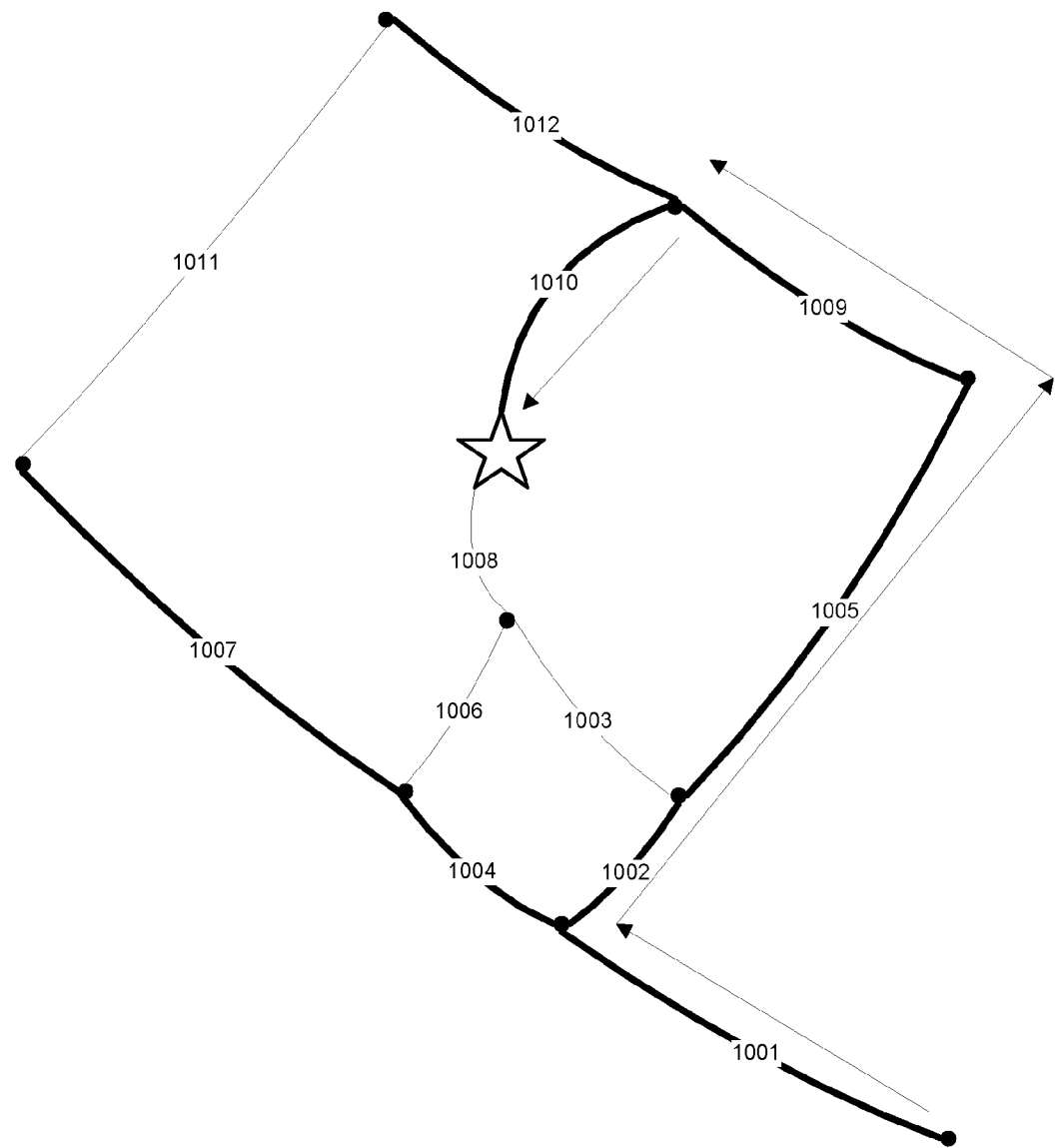
FIG. 10 is map data illustrating the assignment of attribute values to roads in a vicinity of an event.

FIG. 10 illustrates a use of temporally-variant map data to encourage vehicles to use predetermined roads in preference to other roads. Map data is shown in FIG. 10 comprising nine locations and twelve roads 1001-1011 linking those locations. A POI 1013, which could also be considered as a tenth location, such as an event is also included in the map data. Roads 1001, 1002, 1004, 1005, 1007, 1009 and 1012 have a relatively high vehicle capacity i.e. are capable of carrying more vehicles per hour than roads 1003, 1006, 1008, 1011. To denote the higher capacity, roads 1001, 1002, 1004, 1005, 1007, 1009 and 1012 in FIG. 10 are shown in bold. Of course, it may also be desired for roads 1001, 1002, 1004, 1005, 1007, 1009 and 1012 to carry more traffic for other reasons, such as air/noise pollution, not including certain features such as traffic calming, bridges etc, being more easily accessible for emergency vehicles etc. A user at start location indicated in FIG. 10 sets the POI as a destination location. Under normal circumstances when setting the destination location to be the location of the POI 1012, a determined route includes roads 1001, 1002, 1003, 1008. The route may be determined according to a variant of Dijkstra's algorithm by determining a lowest-weight route between the start location and the POI 1013. However, the route includes roads 1003, 1008 which are of a relatively low vehicle capacity. In order to encourage vehicles to avoid the lower capacity roads, i.e. roads 1003, 1008, for the duration of the event, i.e. between first and second predetermined times, temporal map data 840 contains attribute information which reduces a weight of the high capacity roads 1001, 1002, 1004, 1005, 1007, 1009 and 1012 relative to lower capacity roads 1003, 1006, 1008, 1011. At a time between the first and second times, a navigation device 810 operated to determine a route between the start location and the POI 1013 determines a route to include roads 1001, 1002, 1005, 1009, 1010. The lower weighting of roads 1005, 1009, 1010 in comparison to roads 1003, 1008 causes the temporal mapping module 490 to combine the temporally variable map data with the existing map data accessible to the navigation device and select roads 1005, 1009, 1010 as having a combined lower weight than roads 1003, 1008. Thus, vehicles following the route determined y the navigation device during the event are directed to the POI 1013 along higher capacity roads. However prior and subsequent to the event the weight of roads surrounding the POI 1013 is returned to normal such that roads 1003, 1008, 1006, 1011 are more likely to be included in the determined routes.

It will be apparent from the foregoing that the teachings of the present invention provide an arrangement whereby predetermined temporally-variant map data may be used by a navigation device to temporarily affect route determination. Temporally-variant map data is useful to affect vehicular traffic during temporary events.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation device, comprising:
    a processor; and
    a memory store containing map data, the map data being modified with predetermined temporal information for a predetermined time period to include a temporally-variable feature, the predetermined time period including a start time and an end time or a start time and duration, a weight or cost attribute for each road segment associated with the temporally-variable feature, and
    the processor being arranged to:
    determine, in a route planning process, a status of the temporally-variable feature according to the temporal information,
    wherein the weight or cost attribute for at least one high capacity road within a predetermined distance from the temporally-variable feature is reduced to avoid a selection of low capacity roads in the route planning process between a start location and a destination location according to the status; and
    provide at least one route determined in the route planning process.

2. The navigation device of claim 1, wherein the temporally-variable feature of the map data is a map feature having a temporally-variable attribute or a map feature having temporally-variable validity.

3. The navigation device of claim 1, wherein the map data comprises first map data comprising map feature information and second map data comprising the temporally variable feature.

4. The navigation device of claim 1, further comprising:
    a data receiving device to receive data;
    wherein the second map data is received from the data receiving device and stored in the store.

5. The navigation device of claim 1, further comprising a temporal mapping module arranged to determine a status of the temporally-variable feature according to the temporal information.

6. The navigation device of claim 1, wherein the map data comprises a plurality of temporally-variable features, each feature having associated temporal information indicating a period of time for which the respective feature is temporally-variable.

7. A method of determining a route from a start location to a destination location, the method comprising:
    determining, by a processor, a status of one or more temporally-variable map features according to temporal information using pre-determined temporal information related to the one or more temporally-variable features, the predetermined temporal information including a start time and an end time or a start time and duration, wherein the one or more temporally-variable features temporarily modifies map data for a predetermined time period; and
    determining the route from the start location to the destination location with respect to the status of the one or more temporally-variable map features using a weight or cost attribute for each road segment associated with the temporally-variable feature,
    wherein the weight or cost attribute for at least one high capacity road within a predetermined distance from the temporally-variable feature is reduced to avoid a selection of low capacity roads in the route determination between the start location and the destination location according to the status; and
    providing at least one determined route.

8. The method of claim 7, wherein the determining the status of a temporally-variable feature comprises determining, according to the temporal information, a value of an attribute associated with a map feature, or whether a map feature is available for consideration in the route.

9. The method of claim 7, further comprising:
    receiving first map data comprising information associated with the one or more temporally-variable features;
    wherein the route is determined according to the first map data and second map data comprising map feature information.

10. The method of claim 7, further comprising determining, according to the first map data and the temporal information, a status of a map feature included in the second map data.

11. The method of claim 7, further comprising determining, according to the first map data and the temporal information, a status of a map feature additional to the second map data.

12. A system, comprising:
    a server communicatively coupled to a navigation device, wherein the navigation device includes a data storage having first map data stored therein, the server being arranged to communicate second map data to the navigation device herein the second map data includes predetermined temporal information identifying a temporally-variable map feature used modify the second map data for a predetermined time period, the predetermined time period including a start time and an end time or a start time and duration, a weight or cost attribute for each road segment associated with the temporally-variable feature and the navigation device being arranged to receive the second map data and to determine a route according a combination of the first and second map data, wherein the weight or cost attribute for at least one high capacity road within a predetermined distance from the temporally-variable feature is reduced to avoid a selection of low capacity roads in the route planning process between a start location and a destination location according to the predetermined time period; and provide at least one route determined in the route planning process.

13. The navigation device of claim 1, wherein pre-determined temporal information includes at least one of start time information, a start time for each change to the map data, end time information identifying an end time of each change to the map data, feature information identifying features for change, and attribute information identifying feature for change.

14. The navigation device of claim 1, wherein the weight is graduated based on a distance from the event or point of interest.

15. The navigation device of claim 14, wherein the POI or event is permanent or temporary.

16. The system of claim 12, wherein the predetermined time period is a duration of one or more events.

17. The method of claim 7, wherein the route is a route to one of the one or more temporally-variable features associated with the destination.

18. The navigation device of claim 1, wherein the temporally-variable feature is one or more of: a road, a point of interest (POI), a car park and further includes closure or restriction data for an associated temporally-variable feature.

* * * * *